Oct. 17, 1967   A. M. WRIGHT   3,347,494
CIRCULAR MANIFOLD

Filed May 16, 1966   2 Sheets-Sheet 1

INVENTOR.
ALEXANDER M. WRIGHT
BY Radford W. Luther
ATTORNEY

Oct. 17, 1967     A. M. WRIGHT     3,347,494
CIRCULAR MANIFOLD

Filed May 16, 1966     2 Sheets-Sheet 2

INVENTOR.
ALEXANDER M. WRIGHT
BY Radford W. Luther
ATTORNEY

United States Patent Office 3,347,494
Patented Oct. 17, 1967

3,347,494
CIRCULAR MANIFOLD
Alexander M. Wright, West Hartford, Conn., assignor to Chandler Evans Inc., West Hartford, Conn., a corporation of Delaware
Filed May 16, 1966, Ser. No. 550,459
5 Claims. (Cl. 244—14)

This invention relates to missile flight control systems and has particular reference to a manifold structure used for the distribution of pressurized fluid to the aerodynamic fin actuators of a bang-bang type of missile flight control system.

An object of this invention is to provide a lightweight, efficient, reliable and economically mass-produced structure for distribution of high pressure fluid to a plurality of actuators which are circumferentially disposed on an annular housing.

A further object of this invention is to provide a manifold structure capable of lengthy storage under adverse environmental conditions. Accordingly, actuator malfunction probability may be decreased by providing a structure which facilitates inspection for contamination in fluid passageways.

Further objects and advantages of this invention will become evident upon examination of the drawings and specification.

Figure 2:
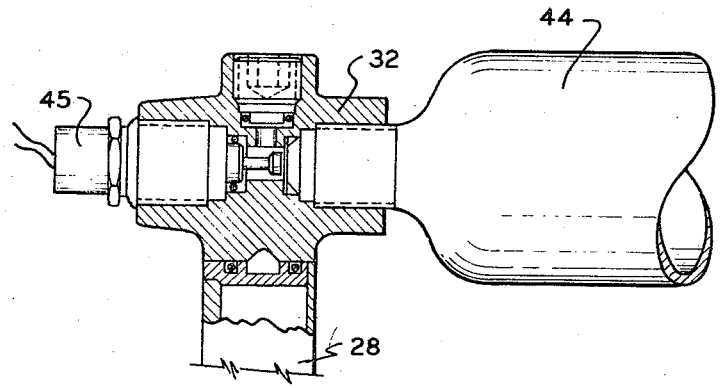
Figure 1:
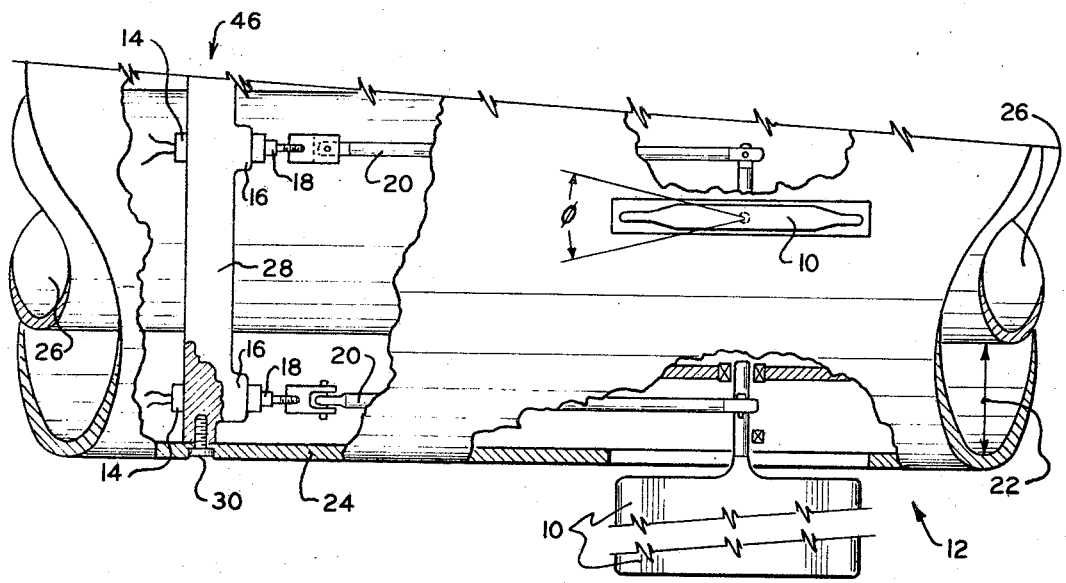
Figure 4:
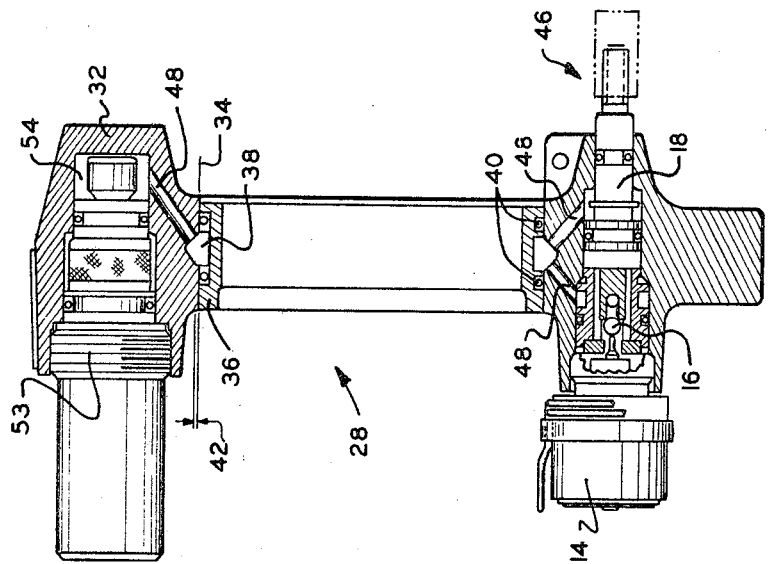
Figure 3:
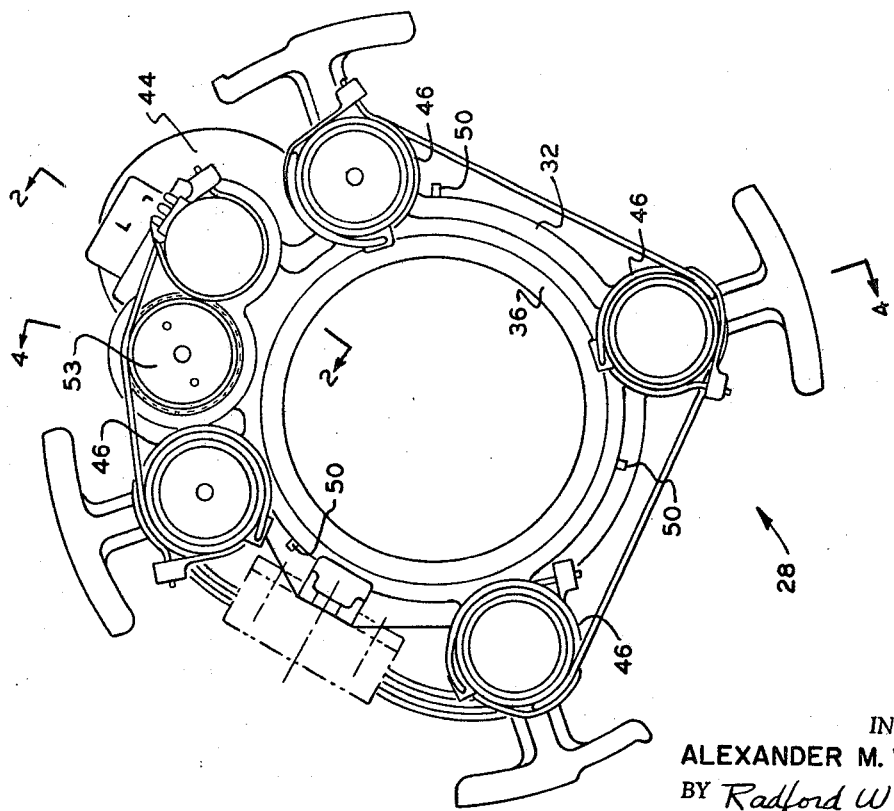

Reference will be made to the following drawings:
FIGURE 1 is a cutaway side elevation of a portion of a missile incorporating the invention.
FIGURE 2 is a fragmentary view, partly in section, taken along lines 2—2 of FIGURE 3.
FIGURES 3 and 4 are respectively plan and sectional views of the manifold.

FIGURE 1 shows two of the four fins 10 which protrude from the missile aft section 12. Solenoids 14 operate ball valves 16 which control fluid flow to fin actuator pistons 18 which drive links 20 connected to fins 10. Dither motions of fins 10 through an arc Φ are initiated by electronic control signal inputs from the missile computer (not shown) to solenoids 14. The links 20 are longitudinally disposed in the annular space 22 between the missile skin 24 and the rocket thruster tube 26. The subject invention manifold structure 28 is also located in annular space 22 and attached to the missile skin 24 by screws 30.

Pressure source 44 (see FIG. 2) is threaded into valve housing 32 and a manually controlled puncturing device 45 is threaded into valve housing 32 to effect the release of fluid from pressure source 44. Solenoid valve-actuator assemblies 46 (see FIG. 3) are substantially equally spaced around valve housing 32. Pins 50 fix sleeve 36 in housing 32.

The missile in-flight guidance system fluid distribution manifold structure 28 (see FIG. 4) comprises an annular valve housing 32 having a central bore 34, a sleeve 36 fixed concentrically within said housing 32, a toroidal passageway 38 formed between said sleeve 36 and said housing 32, packing means 40 disposed outwardly of said passageway 38 to seal any annular clearance 42 between said sleeve 36 and said housing 32, a pressure source 44 carried by said housing 32, a plurality of solenoid valve-actuator assemblies 46 substantially equally spaced around said annular housing 32, conduit means 48 connecting said toroidal passageway 38 to said pressure source 44, and to each of said plurality of assemblies 46. The contact of each of the packing means 40 against an identical diameter sealing surface 34 results in the axial balance of fluid pressure forces in the toroidal passage 38. Fastening means 50 are provided to hold said sleeve 36 within said housing 32 in fixed relationship. Said fastening means 50 are easily removed to permit rapid disassembly and visual inspection of said toroidal passageway 38, said conduit means 48, and said packing means 40. Manifold structure 28 is fastened to and mounted within a right circular cylindrical aft section 12 of the missile outer skin 24 (see FIG. 1) resulting in the coincidence of the axes of said missile skin 24 and said manifold structure 28. Said manifold structure 28 envelops a longitudinal segment of rocket engine exhaust thruster tube 26. Said pressure source 44 (FIG. 3) adjoins a pressure regulating valve 53 thereby minimizing the length of passageway (not shown) which interconnects pressure source 44 and regulating valve 53.

Fluid under pressure is communicated from pressure source 44 to pressure regulating valve 53 (FIG. 4). The regulated fluid flows from pressure regulating valve 53 into chamber 54, thence into connecting conduit means 48, and thence into toroidal passageway 38. The toroidal passageway 38 is composed of mating grooves, one of which is located in the outer circumference of annular sleeve 36, and the other is located on the inner circumference of valve housing 32. Conduit 48 is in fluid communication with toroidal passageway 38 composed of the mating annular grooves of annular sleeve 36 and housing 32 such that fluid under pressure is communicated to a plurality of ball valves 16 and actuating pistons 18 by means of passageways 48 in fluid communication with ball valve 16 and piston 18, respectively, and toroidal passageway 38. Annular sleeve 36 is circumscribed by valve housing 32, and the annular groove in annular sleeve 36 that forms a portion of toroidal passageway 38 is so constructed that the axial forces on the radially disposed faces of the groove in annular sleeve 36 produce a force balance. Similarly, the mating portion of toroidal passageway 38 located on the inner circumference of valve housing 32 is constructed so that the radially disposed faces result in an axial force balance. This balancing of the axial forces on annular sleeve 36 and its circumscribing valve housing 32 produce a toroidal passageway 38 that permits the simultaneous distribution of fluid under pressure to a plurality of ball valves 16 and pistons 18 with no resulting axial force tending to separate annular sleeve 36 and valve housing 32.

The annular sleeve 36 is so constructed and arranged with circumscribing valve housing 32 as to form toroidal passageway 38, thereby permitting the simultaneous distribution of fluid under pressure to a plurality of ball valves and pistons with no axial force tending to separate annular sleeve 36 and valve housing 32. This force-balanced configuration permits the use of relatively light, easily removed fastening means such as pins 50 to permit rapid disassembly and inspection of interior portions of sleeve 36, housing 32 and packing means 40.

While certain details have been described herein, it will be understood that other modifications and changes may be made without departing from the spirit and scope of the appended claims.

I claim:
1. In a missile in-flight guidance system, a fluid distribution manifold structure comprising an annular valve housing having a central bore, a sleeve fixed concentrically within said housing, a toroidal passageway formed between said sleeve and said housing, packing means disposed outwardly of said passageway to seal any annular clearance between said sleeve and said housing, a pressure source carried by said housing, a plurality of valve-actuator assemblies substantially equally spaced around said annular housing, conduit means connecting said toroidal passageway to said pressure source and to each of said plurality of assemblies.

2. A manifold structure according to claim 1 wherein the contact of each of the packing means against an identical diameter sealing surface results in the axial balance of fluid pressure forces in the toroidal passage.

3. A manifold structure according to claim 2 wherein removable fastening means are provided to fix said sleeve within said housing, removal of said fastening means permitting rapid disassembly and visual inspection of said toroidal passageway, said conduit means, and said packing means.

4. A manifold structure according to claim 1 wherein said manifold structure is fastened to and mounted within a right circular cylindrical aft section of the missile outer skin resulting in the coincidence of the axes of said missile skin and said manifold structure, and wherein said manifold structure envelops a longitudinal segment of a rocket engine exhaust thruster tube.

5. A manifold structure according to claim 1 wherein said pressure source adjoins a pressure regulating valve resulting in the minimization of the length of passageways which are subject to source pressure.

References Cited
UNITED STATES PATENTS

| | | | |
|---|---|---|---|
| 3,245,352 | 4/1966 | Summers | 244—3.21 X |
| 3,273,825 | 9/1966 | Kerner | 244—3.22 |
| 3,286,956 | 11/1966 | Nitikman | 244—3.22 X |

BENJAMIN A. BORCHELT, *Primary Examiner.*

W. C. ROCH, T. H. WEBB, *Assistant Examiners.*